US010144663B2

(12) United States Patent
Heitner et al.

(10) Patent No.: US 10,144,663 B2
(45) Date of Patent: Dec. 4, 2018

(54) HYDROPHOBICALLY MODIFIED POLYAMINE SCALE INHIBITORS

(71) Applicant: CYTEC TECHNOLOGY CORP., Wilmington, DE (US)

(72) Inventors: Howard Heitner, Tuckahoe, NY (US); Donald P. Spitzer, Stamford, CT (US)

(73) Assignee: Cytec Technology Corp. DE (US)

( * ) Notice: Subject to any disclaimer, the term of this patent is extended or adjusted under 35 U.S.C. 154(b) by 0 days.

(21) Appl. No.: 14/961,323

(22) Filed: Dec. 7, 2015

(65) Prior Publication Data
US 2016/0083277 A1    Mar. 24, 2016

Related U.S. Application Data

(60) Continuation of application No. 13/786,871, filed on Mar. 6, 2013, now Pat. No. 9,365,442, which is a continuation of application No. 13/109,643, filed on May 17, 2011, now Pat. No. 8,450,452, which is a division of application No. 11/870,925, filed on Oct. 11, 2007, now Pat. No. 7,999,065.

(60) Provisional application No. 60/829,411, filed on Oct. 13, 2006.

(51) Int. Cl.
| *C08G 77/04* | (2006.01) |
| *C02F 5/12* | (2006.01) |
| *C08G 73/02* | (2006.01) |
| *C02F 1/70* | (2006.01) |
| *C02F 101/10* | (2006.01) |
| *C02F 101/16* | (2006.01) |
| *C02F 101/20* | (2006.01) |

(52) U.S. Cl.
CPC ............... *C02F 5/12* (2013.01); *C02F 1/70* (2013.01); *C08G 73/02* (2013.01); *C08G 73/022* (2013.01); *C08G 73/0206* (2013.01); *C08G 73/0213* (2013.01); *C02F 2101/10* (2013.01); *C02F 2101/101* (2013.01); *C02F 2101/163* (2013.01); *C02F 2101/203* (2013.01); *C02F 2303/22* (2013.01); *Y10S 528/901* (2013.01)

(58) Field of Classification Search
CPC ........ C08G 73/02; C08G 73/0206; C02F 1/70
See application file for complete search history.

(56) References Cited

U.S. PATENT DOCUMENTS

| 3,251,778 A * | 5/1966 | Dickson .............. C02F 5/12 134/22.19 |
| 3,251,852 A | 5/1966 | De Groote et al. |
| 3,560,543 A | 2/1971 | Plueddermann |
| 3,779,912 A | 12/1973 | Redmore et al. |
| 4,540,486 A | 9/1985 | Ramsden |
| 5,354,829 A | 10/1994 | Swisher et al. |
| 5,415,782 A | 5/1995 | Dimas |
| 5,437,928 A | 8/1995 | Thimons et al. |
| 6,262,216 B1 | 7/2001 | McGall |
| 6,410,675 B2 | 6/2002 | McGall et al. |
| 6,429,275 B2 | 8/2002 | McGall et al. |
| 6,486,287 B2 | 11/2002 | McGall et al. |
| 6,541,088 B1 | 4/2003 | Rangwalla et al. |
| 6,743,882 B2 | 6/2004 | McGall et al. |
| 6,814,873 B2 * | 11/2004 | Spitzer ............... C01F 7/0606 210/698 |
| 2003/0173303 A1 | 9/2003 | Austin et al. |
| 2004/0011744 A1 | 1/2004 | Spitzer et al. |
| 2004/0162406 A1 | 8/2004 | Spitzer et al. |
| 2005/0010008 A2 | 1/2005 | Spitzer et al. |
| 2005/0274926 A1 | 12/2005 | Spitzer et al. |
| 2006/0124553 A1 | 6/2006 | Taylor et al. |
| 2006/0159975 A1 | 7/2006 | Kim et al. |

FOREIGN PATENT DOCUMENTS

| CA | 2193155 | 6/1997 |
| EP | 0254556 | 1/1988 |
| EP | 0990671 | 4/2005 |
| WO | 1996033953 | 10/1996 |
| WO | 2004009606 | 1/2004 |

OTHER PUBLICATIONS

Yang, et al., Prepr. Pap. Am. Chem. Soc., Div. Fuel Chem. 2004, 49 (2), 599-600.
Macromol. Symp., 2004, 210, 329.

* cited by examiner

*Primary Examiner* — Kuo Liang Peng
(74) *Attorney, Agent, or Firm* — Jericho B. Pacho

(57) ABSTRACT

Hydrophobically modified Si-containing polyamines are useful for treating scale in industrial process streams. Preferred hydrophobically modified Si-containing polyamines are particularly useful for treating aluminosilicate scale in difficult-to-treat industrial process streams, such as in the Bayer alumina process streams, nuclear waste streams and kraft paper mill effluent streams.

15 Claims, No Drawings

HYDROPHOBICALLY MODIFIED POLYAMINE SCALE INHIBITORS

RELATED APPLICATIONS

This application is a continuation application of U.S. patent application Ser. No. 13/786,871, filed Mar. 6, 2013, which is a continuation application of U.S. patent application Ser. No. 13/109,643, filed on May 17, 2011, now issued as U.S. Pat. No. 8,450,452, which is a divisional application of U.S. patent application Ser. No. 11/870,925, filed on Oct. 11, 2007, now issued as U.S. Pat. No. 7,999,065, which claims priority to U.S. Provisional patent application No. 60/829,411, filed on Oct. 13, 2006. The aforementioned applications are incorporated by reference herein in their entirety.

FIELD

This invention relates to polyamines and methods of using them for treating scale in various industrial process streams. Preferred embodiments relate to hydrophobically modified Si-containing polyamines that have been found to be particularly useful for treating aluminosilicate scale in difficult-to-treat industrial process streams, such as in the Bayer alumina process, nuclear waste streams and kraft paper mill effluent streams.

DESCRIPTION OF THE RELATED ART

The formation of scale is a problem in a number of industrial process streams. Scale is a solid material that generally forms on the surfaces of equipment that are exposed to aqueous process streams. Scale typically contains inorganic materials having relatively low aqueous solubility, including for example various hydrated sodium aluminosilicate materials such as amorphous aluminosilicates (e.g., aluminosilicate hydrogel), zeolites, sodalites and canerinites. The removal of scale by mechanical methods, e.g., by scraping, is often undesirable because such procedures may involve considerable expense in terms of process downtime, and may be impractical where the scale forms on surfaces of the process equipment that are difficult to access.

A number of chemical treatments have been developed to remove scale and/or inhibit the formation of scale in various industrial process streams. Such chemical treatments are generally applied by intermixing the treatment chemical with the process stream, thus allowing treatment of surfaces that are difficult to access and reducing or eliminating downtime. A number of Si-containing polymers have been developed in recent years and applied to the treatment of scale. See, e.g., U.S. Pat. No. 6,814,873; U.S. Patent Publication Nos. 2005/0010008, 2004/0162406, 2006/0124553, 2004/0162406, 2004/0011744, and 2005/0274926; and WO 2004 009606. The foregoing patent publications are hereby incorporated by reference in their entireties, and particularly for the purpose of describing various types of scale, as well as particular Si-containing polymers and their use as antiscalants in certain industrial process streams:

The Si-containing polymers and methods of using them described above represent a significant advance in the art, but have not completely solved the problem of scale formation in industrial process streams. Difficult-to-treat industrial process streams are particularly vexing. For example, there is a long-felt need for chemical treatments and methods of reducing and/or inhibiting scale in process streams that contain a relatively high level of sulfate, finely dispersed iron oxide (e.g., "red mud"), finely dispersed sodalite, and/or combined nitrate/nitrite.

A variety of Si-containing polymers have been developed for other purposes, but without any particular motivation to apply such non-analogous art to the treatment of scale. See, e.g., U.S. Pat. Nos. 3,560,543; 5,354,829; 6,262,216; 6,410,675; 6,429,275; 6,486,287; and 6,743,882; U.S. Patent Publication No. 2006/0159975; Canadian CA2,193,155; Yang et al, Prepr. Pap.-Am. Chem. Soc., Div. Fuel Chem. 2004, 49(2), 599-600; and Macromol. Symp. 2004, 210, 329.

SUMMARY

Novel Si-containing polymers and methods have now been developed for the treatment of scale in industrial process streams. Surprisingly, it has been found that relatively hydrophobic Si-containing polymers may provide substantially higher performance than otherwise comparable polymers of lesser hydrophobicity.

An embodiment provides polymer comprising a recurring unit of the formula (I) and a recurring unit of the formula (II):

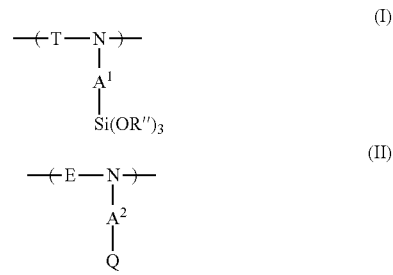

wherein:
T and E are each independently a first optionally substituted hydrocarbyl radical comprising from about 2 to about 40 carbons;
Q is H or a second optionally substituted hydrocarbyl radical comprising from about 1 to about 20 carbons;
$A^1$ and $A^2$ are each independently a direct bond or an organic connecting group comprising from about 1 to about 20 carbons;
R"=H, optionally substituted $C_1$-$C_{20}$ alkyl, optionally substituted $C_6$-$C_{12}$ aryl, optionally substituted $C_7$-$C_{20}$ aralkyl, optionally substituted $C_2$-$C_{20}$ alkenyl, Group I metal ion, Group II metal ion, or $NR^1_4$, where each $R^1$ is independently selected from H, optionally substituted $C_1$-$C_{20}$ alkyl, optionally substituted $C_6$-$C_{12}$ aryl, optionally substituted $C_7$-$C_{20}$ aralkyl, and optionally substituted $C_2$-$C_{20}$ alkenyl; and
the polymer has a weight average molecular weight of at least about 500;
with a first proviso that when $A^2$-Q is H, at least one of T and E comprises 4 or more carbon atoms;
with a second proviso that when $A^2$-Q is not H, at least one of T and E comprises 2 or more carbon atoms;
with a third proviso that Q does not contain a Si(OR")$_3$ group;
with a fourth proviso that $A^2$ is not unsubstituted —C(=O)-alkyl; and
with a fifth proviso that when Q is OH or $NH_2$, $A^1$ and $A^2$ are not both alkylene.

Another embodiment provides a composition comprising a polymeric reaction product of at least a polyamine, a first nitrogen-reactive compound, and a second nitrogen-reactive compound, the polymeric reaction product having a weight average molecular weight of at least about 500, wherein:

the first nitrogen-reactive compound comprises a —Si(OR")$_3$ group and a nitrogen-reactive group, where R"=H, optionally substituted $C_1$-$C_{20}$ alkyl, optionally substituted $C_6$-$C_{12}$ aryl, optionally substituted $C_7$-$C_{20}$ aralkyl, optionally substituted $C_2$-$C_{20}$ alkenyl, Group I metal ion, Group II metal ion, or $NR^1_4$, each $R^1$ being independently selected from H, optionally substituted $C_1$-$C_{20}$ alkyl, optionally substituted $C_6$-$C_{12}$ aryl, optionally substituted $C_7$-$C_{20}$ aralkyl, and optionally substituted $C_2$-$C_{20}$ alkenyl;

the second nitrogen-reactive compound comprises a nitrogen-reactive group and does not contain a Si(OR")$_3$ group; and at least one of the polyamine and the second nitrogen-reactive compound comprises an optionally substituted hydrocarbyl radical comprising from about 2 to about 40 carbons.

Another embodiment provides a method for reducing or eliminating scale in an industrial process, comprising adding a polymer or composition as described herein to the process.

Another embodiment provides a method for treating scale in a difficult-to-treat process stream, comprising intermixing a polymer with a process stream in an amount effective to reduce or eliminate aluminosilicate scale in the process stream, wherein the process stream comprises at least one selected from a sulfate level of at least about 1 g/L, a finely dispersed iron oxide level of at least about 20 mg/L, a finely dispersed sodalite level of at least about 20 mg/L, and a combined nitrate/nitrite concentration of at least about 0.5 molar; and wherein the polymer comprises a recurring unit of the formula (I) and a recurring unit of the formula (II):

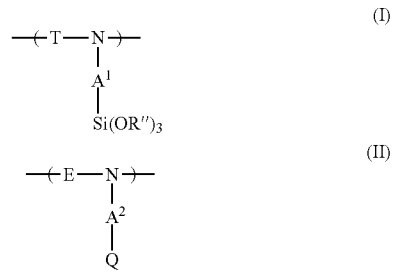

wherein:

T and E are each independently a first optionally substituted hydrocarbyl radical comprising from about 2 to about 40 carbons;

Q is H or a second optionally substituted hydrocarbyl radical comprising from about 1 to about 20 carbons;

$A^1$ and $A^2$ are each independently a direct bond or an organic connecting group comprising from about 1 to about 20 carbons; and R"=H, optionally substituted $C_1$-$C_{20}$ alkyl, optionally substituted $C_6$-$C_{12}$ aryl, optionally substituted $C_7$-$C_{20}$ aralkyl, optionally substituted $C_2$-$C_{20}$ alkenyl, Group I metal ion, Group II metal ion, or $NR^1_4$, where each $R^1$ is independently selected from H, optionally substituted $C_1$-$C_{20}$ alkyl, optionally substituted $C_6$-$C_{12}$ aryl, optionally substituted $C_7$-$C_{20}$ aralkyl, and optionally substituted $C_2$-$C_{20}$ alkenyl.

These and other embodiments are described in greater detail below.

DETAILED DESCRIPTION

Terms such as "treatment" and "treating", in the context of describing methods for the treatment of scale, are broad terms that are used herein in their ordinary sense as understood by those skilled in the art, and thus include methods that result in the inhibition and/or prevention of scale formation, as well as reduction, removal and/or elimination of existing scale.

The term "scale" is a broad term that is used herein in its ordinary sense as understood by those skilled in the art, and thus includes various primarily or completely inorganic deposits formed on the surfaces of equipment exposed to industrial process streams. Examples of scale include hydrated sodium aluminosilicate materials such as amorphous aluminosilicates (e.g., aluminosilicate hydrogel), zeolites, sodalites and canerinites.

Terms used herein to describe chemical materials, such as "anti-scalant", "scale inhibitor", "scale reducing additive", etc., are broad terms that are used herein in their ordinary sense as understood by those skilled in the art and thus include chemical materials (such as polymers) that are useful for treating scale.

The term "polymer" is a broad term that is used herein in its ordinary sense as understood by those skilled in the art, and thus includes copolymers. Reference herein to the molecular weight of a polymer is understood to be a reference to weight average molecular weight as measured by size exclusion chromatography (light scattering detection). In various embodiments, Si-containing polymers (including, for example, the polymer P1 described herein) can have a molecular weight of at least about 500, at least about 1,000, at least about 2,000, or at least about 5,000. In some embodiments, higher or lower molecular weights are preferred. Although some polymers may be referred to herein as being "hydrophobically modified", it will be understood that this term is used for the sake of convenience, and that such polymers are not limited to those produced by hydrophobic modification of a pre-existing polymer.

The terms "hydrocarbon" and "hydrocarbyl" are broad terms that are used herein in their ordinary sense as understood by those skilled in the art, and thus include organic compounds or radicals consisting exclusively of the elements carbon and hydrogen. These moieties include alkyl, alkylene, alkenyl, alkynyl, and aryl moieties. These moieties also include alkyl, alkenyl, alkynyl, and aryl moieties substituted with other aliphatic or cyclic hydrocarbon groups, such as alkaryl, alkenaryl and alkynaryl. Unless otherwise indicated, these moieties preferably comprise 1 to 40 carbon atoms. Hydrocarbyl radicals may be substituted with various groups that do not consist exclusively of the elements carbon and hydrogen, and thus a substituted hydrocarbyl radical may contain one or more heteroatoms such as oxygen and/or nitrogen.

The term "substituted", whether preceded by the term "optionally" or not, is a broad term that is used herein in its ordinary sense as understood by those skilled in the art. "Substituted" thus includes replacement of one or more hydrogen radicals in a given structure with one or more substituent groups, which may be any permissible organic substituents of the given structure. Examples of substituents that may be permissible for a given structure include hydroxy; $C_{1-10}$ alkyl; $C_{1-10}$ alkenyl; allyl; halogen; $C_{1-10}$ haloalkyl; $C_{1-10}$ alkoxy; hydroxy $C_{1-10}$ alkyl; carboxy; $C_{1-10}$ carboalkoxy (also referred to as alkoxycarbonyl); $C_{1-10}$ carboxyalkoxy; $C_{1-10}$ carboxamido (also referred to as alkylaminocarbonyl); cyano; formyl; $C_{1-10}$ acyl; nitro; amino; $C_{1-10}$ alkylamino; $C_{1-10}$ dialkylamino; anilino; mercapto; $C_{1-10}$ alkylthio; sulfoxide; sulfone; $C_{1-10}$ acylamino; amidino; phenyl; benzyl; heteroaryl; heterocycle; phenoxy; benzoyl; benzoyl substituted with amino, hydroxy, methoxy, methyl or halo; benzyloxy and heteroaryloxy. When the group that is substituted contains an alkyl segment, two hydrogen atoms on the same carbon atom may be replaced by a single substituent double bonded to the carbon atom, e.g., oxo (=O).

Various compositions are described herein, including polymers and polymeric reaction products, along with various methods for using such compositions. It will be understood by those skilled in the art that the various compositions described herein may be used in any of the described methods, and that the described methods may employ any of the described compositions. Thus, it will be understood that the inventions described herein are not limited to the descriptions of the particular embodiments.

Compositions and Methods of Making them

An embodiment provides a polymer comprising a recurring unit of the formula (I) and a recurring unit of the formula (II):

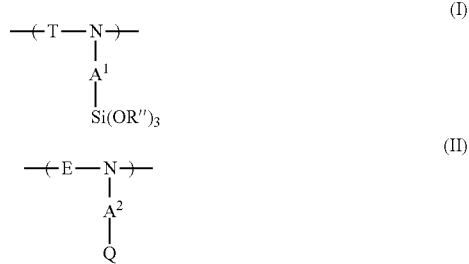

wherein:
T and E are each independently a first optionally substituted hydrocarbyl radical comprising from about 2 to about 40 carbons;
Q is H or a second optionally substituted hydrocarbyl radical comprising from about 1 to about 20 carbons;
$A^1$ and $A^2$ are each independently a direct bond or an organic connecting group comprising from about 1 to about 20 carbons; and
R"=H, optionally substituted $C_1$-$C_{20}$ alkyl, optionally substituted $C_6$-$C_{12}$ aryl, optionally substituted $C_7$-$C_{20}$ aralkyl, optionally substituted $C_2$-$C_{20}$ alkenyl, Group I metal ion, Group II metal ion, or $NR^1_4$, where each $R^1$ is independently selected from H, optionally substituted $C_1$-$C_{20}$ alkyl, optionally substituted $C_6$-$C_{12}$ aryl, optionally substituted $C_7$-$C_{20}$ aralkyl, and optionally substituted $C_2$-$C_{20}$ alkenyl.

The term "polymer P1" may be used herein to refer to polymers comprising a recurring unit of the formula (I) and a recurring unit of the formula (II). In an embodiment, the polymer P1 comprises recurring units of the formula (I) in which R" is a Group I metal ion (e.g., Na), a Group (II) metal ion (e.g., K) and/or $NR^1_4$ (e.g., ammonium). In various embodiments, the polymer P1 may be further described as being subject to one or more of the following provisos: a first proviso that when $A^2$-Q is H, at least one of T and E comprises 4 or more carbon atoms; a second proviso that when $A^2$-Q is not H, at least one of T and E comprises 2 or more carbon atoms; a third proviso that Q does not contain a Si(OR")$_3$ group; a fourth proviso that $A^2$ is not unsubstituted —C(=O)-alkyl; and/or a fifth proviso that when Q is OH or $NH_2$, $A^1$ and $A^2$ are not both alkylene. It will be understood that the polymer P1 may comprise other recurring units as well. For example, in an embodiment, a polymer comprising a recurring unit of the formula (I) and a recurring unit of the formula (II) further comprises a recurring unit of the formula —((CH$_2$)$_n$—NH)—, wherein n is an integer in the range of about 2 to about 10. The amounts of recurring unit in the polymer P1 may vary over a broad range. For example, in an embodiment, the polymer P1 comprises at least about 0.1 mole percent, preferably at least about 1 mole percent of recurring units of the formula (I) and at least about 0.1 mole percent, preferably at least about 1 mole percent of recurring units of the formula (II), based on total moles of recurring units in the polymer P1.

As indicated above, the recurring units of the formulae (I) and (II) in the polymer P1 include $A^1$ and $A^2$, which are each independently a direct bond or an organic connecting group comprising from about 1 to about 20 carbons. Examples of suitable organic connecting groups include those in which $A^1$ and $A^2$ are each independently represented by -$A^3$-$A^4$-$A^5$-$A^6$-, where:
$A^3$=a direct bond, NR' or O, where R' is H or $C_{1-3}$ alkyl;
$A^4$=a direct bond, C=O, optionally substituted $C_1$-$C_{10}$ alkylene, or optionally substituted $C_6$-$C_{12}$ aryl;
$A^5$=a direct bond, O, NR'", amide, urethane or urea, where R'" is H or $C_{1-3}$ alkyl; and
$A^6$=a direct bond, O, optionally substituted $C_1$-$C_{20}$ alkyl, optionally substituted $C_2$-$C_{20}$ alkenyl or optionally substituted $C_7$-$C_{20}$ aralkyl.

Examples of organic connecting groups $A^1$ and $A^2$ include —CH(OH)—CH$_2$—, —CH$_2$—CH(OH)—, —CH(OH)—CH$_2$—O—, —CH$_2$—CH(OH)—O—, —CH$_2$—CH(OH)—CH$_2$—O—, —C(=O)—CH(CO$_2$M)-, —C(=O)—CH(CH$_2$CO$_2$M)- and —C(=O)—CH$_2$—CH(CO$_2$M)-, where M is H, a metal cation such as Na, an ammonium cation such as tetraalkylammonium or NH$_4$, or an organic group such as optionally substituted $C_1$-$C_{20}$ alkyl, optionally substituted $C_6$-$C_{12}$ aryl, optionally substituted $C_7$-$C_{20}$ aralkyl, or optionally substituted $C_2$-$C_{20}$ alkenyl. In a preferred embodiment, at least one of the organic connecting groups $A^1$ and $A^2$ is —CH$_2$—CH(OH)—CH$_2$—O—.

Those skilled in the art will appreciate that hydrophobicity may be incorporated in various ways into the polymer P1. In an embodiment, at least one of the first and second hydrocarbyl radicals T, E and Q is optionally substituted $C_1$-$C_{20}$ alkyl, optionally substituted $C_6$-$C_{12}$ aryl, optionally substituted $C_7$-$C_{20}$ aralkyl, or optionally substituted $C_2$-$C_{20}$ alkenyl. For example, in some embodiments, at least one of the first hydrocarbyl radicals T and E is selected from —(CH$_2$)$_2$— and a hydroxypropylene, e.g., —CH$_2$—CH(OH)—CH$_2$—. Q is preferably selected from propyl, butyl, pentyl, hexyl, 2-ethylhexyl, octyl, decyl, $C_7$-$C_{20}$ alkylphenyl (e.g., cresyl, nonylphenyl), cetyl, octenyl, and octadecyl. In some embodiments, Q is selected from butyl, 2-ethylhexyl, phenyl, cresyl, nonylphenyl, cetyl, octenyl, and octadecyl. When $A^2$-Q is H, T and E are preferably each independently selected from optionally substituted $C_2$-$C_8$ alkylene, isophorone and hydroxypropylene.

Another embodiment provides a composition comprising a polymeric reaction product of at least a polyamine, a first nitrogen-reactive compound, and a second nitrogen-reactive compound, the polymeric reaction product having a weight average molecular weight of at least about 500, wherein:

the first nitrogen-reactive compound comprises a —Si(OR")$_3$ group and a nitrogen-reactive group, where R"=H, optionally substituted $C_1$-$C_{20}$ alkyl, optionally substituted $C_6$-$C_{12}$ aryl, optionally substituted $C_7$-$C_{20}$ aralkyl, optionally substituted $C_2$-$C_{20}$ alkenyl, Group I metal ion, Group II metal ion, or $NR^1_4$, each $R^1$ being independently selected from H, optionally substituted $C_1$-$C_{20}$ alkyl, optionally substituted $C_6$-$C_{12}$ aryl, optionally substituted $C_7$-$C_{20}$ aralkyl, and optionally substituted $C_2$-$C_{20}$ alkenyl;

the second nitrogen-reactive compound comprises a nitrogen-reactive group and does not contain a Si(OR")$_3$ group; and at least one of the polyamine and the second nitrogen-reactive compound comprises an optionally substituted hydrocarbyl radical comprising from about 2 to about 40 carbons.

The term "PRP1" may be used herein to refer to such a polymeric reaction product. Various polyamines may be used to make PRP1. For example, in an embodiment, the polyamine comprises a recurring unit of the formula —(CH$_2$)$_r$—NR""—, where r is an integer in the range of 1 to about 20 and R"" is H, optionally substituted $C_1$-$C_{20}$ alkyl, optionally substituted $C_6$-$C_{12}$ aryl, optionally substituted $C_7$-$C_{20}$ aralkyl, or optionally substituted $C_2$-$C_{20}$ alkenyl. In another embodiment, the polyamine comprises a (NR$^4_2$)-J-(NR$^4_2$) moiety, wherein J is an optionally substituted hydrocarbyl fragment comprising from about 2 to about 40 carbons; and each $R^4$ is independently H, optionally substituted $C_{1-8}$ alkyl, or optionally substituted $C_{6-10}$ aryl. Preferably, the hydrocarbyl fragment J is optionally substituted $C_3$-$C_{20}$ alkyl, optionally substituted $C_3$-$C_{20}$ alkenyl group or optionally substituted $C_3$-$C_{20}$ aryl. Preferably, the polyamine is a $C_6$-$C_{20}$ aliphatic diamine. Examples of suitable polyamines include polyethyleneimine, triethylenetetramine, 1,2-diaminoethane, 1,3-diaminopropane, 1,4-diaminobutane, 1,5-diaminopentane, 1,5-diaminohexane, 1,8-diaminooctane, diaminoisophorone, aminoaniline, and aminomethylbenzylamine.

Various Si-containing nitrogen-reactive compounds may be used to make PRP1. Suitable Si-containing nitrogen-reactive compounds comprise a nitrogen-reactive group, e.g., containing suitably configured halide, sulfate, epoxide, isocyanates, anhydride, carboxylic acid, and/or acid chloride functionalities. Examples of suitable nitrogen-reactive groups include alkyl halide (e.g., chloropropyl, bromoethyl, chloromethyl, and bromoundecyl) epoxy (e.g., glycidoxypropyl, 1,2-epoxyamyl, 1,2-epoxydecyl or 3,4-epoxycyclohexylethyl), isocyanate (e.g., isocyanatopropyl or isocyanatomethyl that react to form a urea linkage), anhydride (e.g., malonic anhydride, succinic anhydride) and combinations of such groups, e.g., a combination of a hydroxyl group and a halide, such as 3-chloro-2-hydroxypropyl. Triethoxysilylpropylsuccinic anhydride, glycidoxypropyl trimethoxysilane and chloropropyl trimethoxysilane are examples a nitrogen-reactive compounds that comprise a —Si(OR")$_3$ group and a nitrogen-reactive group. A variety of such compounds are known to those skilled in the art, see, e.g., U.S. Pat. No. 6,814,873, which is hereby incorporated by reference and particularly for the purpose of describing such compounds and methods of incorporating them into polymers.

Various nitrogen-reactive compounds that comprise a nitrogen-reactive group and that do not contain a Si(OR")$_3$ group may be used to make PRP1. Suitable nitrogen-reactive compounds include those containing one or more of the nitrogen-reactive groups mentioned above. Non-limiting examples of nitrogen-reactive compounds that comprise a nitrogen-reactive group and that do not contain a Si(OR")$_3$ group include $C_1$-$C_{20}$ alkyl halides (e.g., chlorides, bromides, and iodides of alkyls such as methyl, ethyl, propyl, butyl, pentyl, hexyl, and octyl), alkenyl halides such as allyl chloride, aralkyl halides such as benzyl chloride, alkyl sulfates such as dimethyl sulfate, compounds containing at least one epoxide group (e.g., glycidyl alcohols, phenols, and amines), and compounds containing an anhydride group e.g., alkenyl malonic anydrides and/or alkenyl succinic anhydrides. Examples of preferred second nitrogen-reactive compounds include dimethylsulfate, chlorooctane, chlorohexane, benzyl chloride, epichlorohydrin, glycidyl 4-nonylphenylether, butyl glycidyl ether, 2-ethylhexyl glycidyl ether, phenyl glycidyl ether, $C_{12}$-$C_{14}$ alkyl glycidyl ether, cresyl glycidyl ether, octenylsuccinic anhydride and octadecenylsuccinic anhydride. In some embodiments, the second nitrogen-reactive compound (comprising a nitrogen-reactive group and not containing a Si(OR")$_3$ group) comprises at least two nitrogen-reactive functionalities, which may be the same or different from one another.

A composition that comprises PRP1 may comprise the polymer P1. For example, in an embodiment, PRP1 comprises a recurring unit of the formula (I) and a recurring unit of the formula (II), wherein T, E, Q, $A^1$, $A^2$ and R" have the same meanings as set forth above. It will be understood that the first, second, third, fourth and fifth provisos described above with respect to the polymer P1, each alone or together in any combination, may apply in the context of a PRP1 that comprises the polymer P1.

The polymers and compositions described herein can be made in various ways. For example, PRP1 and the polymer P1 may be prepared by reacting together under suitable conditions, in any order, a polyamine, a first nitrogen-reactive compound, and a second nitrogen-reactive compound, as those materials are described above. It will be understood that each of the polyamine, the first nitrogen-reactive compound, and the second nitrogen-reactive compound may comprise a mixture of particular compounds. Those skilled in the art can identify suitable reaction conditions and prepare a wide variety of polymers and compositions (e.g., PRP1 and the polymer P1), using routine experimentation informed by the guidance provided herein.

In a first embodiment of a method of making PRP1 and the polymer P1, a backbone polyamine (e.g., polyethyleneimine), typically having a relatively higher molecular weight (as compared to the polyfunctional amine monomer described below), is functionalized by reacting with the first nitrogen-reactive compound (to thereby incorporate —Si(OR")$_3$ groups), and the second nitrogen-reactive compound (to thereby incorporate or increase hydrophobicity). In many cases, the overall length of the backbone polyamine is not increased, although the molecular weight of the polyamine is increased by the attachment of the Si-containing group and the non-Si-containing hydrophobic group. Molecular weight may also be increased by crosslinking. In many cases the reaction is not a polymerization per se, but is instead a polymer functionalization (with possible crosslinking). The product of such a reaction (which may be PRP1 or P1) may be referred to herein as a silanized hydrophobically modified polyamine. Examples 1-6 below illustrate methods for making polymers in accordance with this first embodiment.

In a second embodiment of a method of making PRP1 and the polymer P1, a relatively low molecular weight polyamine monomer or oligomer (e.g., a polyfunctional amine monomer such a triethylenetetramine) is reacted with the first nitrogen-reactive compound and the second nitrogen-reactive compound. In this second embodiment, at least one of the first nitrogen-reactive compound and the second nitrogen-reactive compound comprises at least two nitrogen-reactive functionalities, and the overall formation of the resulting polymer may be considered to involve a condensation polymerization between the polyamine and the first/ and or second nitrogen-reactive compound(s), along with possible crosslinking. Examples 7-15 below illustrate methods for making polymers in accordance with this second embodiment.

Methods of Treating Scale

The polymers and compositions described herein (e.g., PRP1 and the polymer P1, including all of the embodiments described herein) are useful for treating scale (e.g., aluminosilicate scale) in various industrial process streams, e.g., Bayer process streams, boiler water, nuclear waste process streams, a papermaking process streams. Methods for treating scale may be carried out by intermixing the polymer with the process stream in an amount effective to reduce or eliminate scale. In preferred embodiments, such methods unexpectedly provide significant improvements in scale reduction. An embodiment provides a method for reducing or eliminating scale in an industrial process, comprising adding a polymer and/or composition as described herein to the process, preferably in an amount effective to reduce or eliminate scale. Typically the amount of polymer and/or composition that is effective to reduce or eliminate scale (e.g., aluminosilicate scale) in the process stream is in the range of about 1 ppm to about 500 ppm, by weight based on the process stream, although in some cases smaller or larger amounts may be effective. Those skilled in the art can identify effective amounts of polymer and/or composition for a particular process steam, using routine experimentation informed by the guidance provided herein.

In preferred embodiments, the polymers and/or compositions are particularly useful for treating aluminosilicate scale in difficult-to-treat industrial process streams, such as in the Bayer alumina process, nuclear waste streams and kraft paper mill effluent streams. An embodiment provides a method for treating scale in a difficult-to-treat process stream, comprising intermixing a polymer with a process stream in an amount effective to reduce or eliminate aluminosilicate scale in the process stream. Those skilled in the art are familiar with difficult-to-treat process streams, which may have any or more, in any combination, of the following characteristics: a sulfate level of at least about 1 g/L, a finely dispersed iron oxide level of at least about 20 mg/L, a finely dispersed sodalite level of at least about 20 mg/L, and/or a combined nitrate/nitrite concentration of at least about 0.5 molar.

EXAMPLES

Test Procedure A: A difficult-to-treat liquor is prepared and used to test the polymers described in the Examples below. The difficult-to-treat liquor is made by adding 12 ml of a sodium silicate solution (27.7 g/L of a sodium silicate solution which is 28.9% $SiO_2$) to 108 ml of a sodium aluminate solution that contains sodium aluminate, excess sodium hydroxide, sodium carbonate, and sodium sulfate. After mixing, the solution contains 0.8 g/L $SiO_2$, 45 g/L $Al_2O_3$, 150 g/L NaOH, 60 g/L $Na_2CO_3$, and 20 g/L $Na_2SO_4$. Aliquots of this solution are placed into 125 ml polyethylene bottles. A polymer described in the Examples below is also added to the bottle (generally the polymer is added in the form of a solution containing 0.1-10% of active reagent); blank (control) samples are also prepared without the polymer. The sealed bottles are heated with agitation at 100° C. for 18±2 hours. At the end of the 18 hours, the bottles are opened and the solution is filtered. With no polymer additive to the system (blank tests), considerable aluminosilicate is formed and is recovered on the filter paper. The total aluminosilicate precipitated in the blank tests is typically about 200 mg. In the Examples below, the amount of aluminosilicate precipitated is a measure of antiscalant activity and is expressed as a percentage of the aluminosilicate that formed in the corresponding blank experiments that were part of the same set of tests. Results obtained using comparative polymers are indicated by a "*" in the Tables below.

This difficult-to-treat liquor contains relatively high levels of sulfate and carbonate and is considered more difficult to treat than the liquor described in U.S. Pat. No. 6,814,873, and thus represents a particularly difficult-to-treat Bayer liquor. Only about 150 mg of precipitate is formed in the blank tests with the liquor described in U.S. Pat. No. 6,814,873, whereas a larger amount (typically about 200 mg) of precipitate forms in the blank tests with the difficult-to-treat liquor used to test the polymers described in the Examples below.

Test Procedure B: This procedure is conducted in the same manner as Test Procedure A except that 150 mg/L of "red mud" solids are added to the test liquor. These red mud solids are obtaining by washing, drying and grinding actual red mud waste obtained from a Bayer alumina plant.

Test Procedure C: This procedure is conducted in the same manner as Test Procedure A except that 50 mg/L of sodalite solids are added to the test liquor and the test is run for only four hours instead of 18. The sodalite solids are made by reacting kaolin with sodium hydroxide.

Example 1

Product A (comparative) is made as follows: 10.00 g of polyethyleneimine (Lupasol WF from BASF) is mixed with about 2.19 g of glycidoxypropyl trimethoxysilane (4 mole % based on the PEI recurring unit weight). The mixture is heated at 75° C. for 16 hours to give a polymeric reaction product. Aqueous NaOH solution (20 g/L) is then added to hydrolyze the methoxysilane groups to —Si—ONa groups to make a 10% solution of the sodium salt.

Product B1 (hydrophobically modified) is made in a similar fashion as follows: 10.00 g of polyethyleneimine (Lupasol WF from BASF) is mixed with 2.19 g glycidoxypropyltrimethoxysilane (4 mole % based on the PEI recurring unit weight) and 0.71 g chlorooctane (2 mole % based on the PEI recurring unit weight). The mixture is heated at 75° C. for 16 hours to give a polymeric reaction product. Aqueous NaOH solution (20 g/L) is then added to make a 10% solution of the sodium salt.

Product B2 (hydrophobically modified) is made as follows: 8.66 g of polyethyleneimine (Lupasol WF from BASF) is mixed with 1.90 g glycidoxypropyltrimethoxysilane (4 mole % based on the PEI recurring unit weight) and 1.34 benzyl chloride (5.26 mole % based on the PEI recurring unit weight). The mixture is heated at 75° C. for 16 hours to give a polymeric reaction product. Aqueous NaOH solution (20 g/L) is then added to make a 10% solution of the sodium salt.

Tests comparing Products A, B1 and B2 (Table 1) in accordance with Test Procedure A show that the relatively more hydrophobic Products B1 and B2 give significantly better reduction in the amount of sodalite precipitated.

TABLE 1

| | | % Sodalite Precipitated | |
|---|---|---|---|
| | | Dose | |
| No. | Product | 5 ppm | 3 ppm |
| 1A* | A | 19 | 35 |
| 1B | B1 | 0.4 | 4.1 |
| 1C* | A | 12 | |
| 1D | B2 | 2.0 | |

Example 2

Product C (hydrophobically modified) is made as follows: 10.00 g of polyethyleneimine (Lupasol WF made by BASF) is mixed with 2.19 g glycidoxypropyltrimethoxysilane (4 mole % based on the PEI recurring unit weight) and 0.64 g glycidyl 4-nonylphenylether (1 mole % based on the PEI recurring unit weight). The mixture is heated at 75° C. for 16 hours to give a polymeric reaction product. Aqueous NaOH solution (20 g/L) is then added to make a 10% solution of the sodium salt.

Tests comparing Products A and C (Table 2) in accordance with Test Procedure A show that the relatively more hydrophobic Product C gives significantly better reduction in the amount of sodalite precipitated.

TABLE 2

| | | % Sodalite Precipitated | |
|---|---|---|---|
| | | Dose | |
| No. | Product | 5 ppm | 3 ppm |
| 2A* | A | 12 | 32 |
| 2B | C | 0 | 4.9 |

Example 3

Product D (comparative) is made as follows: 5.00 g of polyethyleneimine (Lupasol PR 8515 from BASF) is mixed with about 1.1 g of glycidoxypropyl trimethoxysilane (4 mole % based on the PEI recurring unit weight). The mixture is kept at room temperature for 16 hours, then heated at 75° C. for 4 hours to give a polymeric reaction product. Aqueous NaOH solution (20 g/L) is then added to hydrolyze the methoxysilane groups to —Si—ONa groups to make a 10% solution of the sodium salt.

Product E (hydrophobically modified) is made as follows: 5.00 g of polyethyleneimine (Lupasol PR 8515 from BASF) is mixed with 1.10 g glycidoxypropyltrimethoxysilane (4 mole % based on the PEI recurring unit weight) and 0.64 g glycidyl 4-nonylphenylether (1 mole % based on the PEI recurring unit weight). The mixture is kept at room temperature for 16 hours, then heated at 75° C. for 4 hours to give a polymeric reaction product. Aqueous NaOH solution (20 g/L) is then added to make a 10% solution of the sodium salt.

Products F and G are made in a similar fashion to Product E, except that 1.61 g glycidyl 4-nonylphenylether (5 mole % based on the PEI recurring unit weight) is used to make Product F, and 3.21 g glycidyl 4-nonylphenylether (10 mole % based on the PEI recurring unit weight) is used to make product G, instead of the amount of glycidyl 4-nonylphenylether used to make Product E.

Tests comparing Products D, E, F and G (Table 3) in accordance with Test Procedure A show that the relatively more hydrophobic Products E, F and G give significantly better reduction in the amount of sodalite precipitated.

TABLE 3

| | | % Sodalite Precipitated | | | |
|---|---|---|---|---|---|
| | | Dose | | | |
| No. | Product | 20 ppm | 10 ppm | 5 ppm | 3 ppm |
| 3A* | D | 96 | 100 | | |
| 3B | E | 0.1 | 1.3 | 20 | 54 |
| 3C | F | 0 | 0.2 | 1.1 | 9.3 |
| 3D | G | 0 | 0 | 25 | 24 |

Example 4

Product H (comparative) is made as follows: 5.00 g of polyethyleneimine (Lupasol PR 8515 from BASF) is mixed with about 0.92 g of chloropropyl trimethoxysilane (4 mole % based on the PEI recurring unit weight). The mixture is kept at room temperature for 16 hours, then heated at 75° C. for 4 hours to give a polymeric reaction product. Aqueous NaOH solution (20 g/L) is then added to hydrolyze the methoxysilane groups to —Si—ONa groups to make a 10% solution of the sodium salt.

Product I (hydrophobically modified) is made as follows: 5.00 g of polyethyleneimine (Lupasol PR 8515 from BASF) is mixed with 0.92 g of chloropropyl trimethoxysilane (4 mole % based on the PEI recurring unit weight) and 1.46 g dimethylsulfate (10 mole % based on the PEI recurring unit weight). The mixture is kept at room temperature for 16 hours, then heated at 75° C. for 4 hours to give a polymeric reaction product. Aqueous NaOH solution (20 g/L) is then added to make a 10% solution of the sodium salt.

Tests comparing Products H and I (Table 4) in accordance with Test Procedure A show that the relatively more hydrophobic Product I gives significantly better reduction in the amount of sodalite precipitated.

TABLE 4

| | | % Sodalite Precipitated | |
|---|---|---|---|
| | | Dose | |
| No. | Product | 100 ppm | 300 ppm |
| 4A* | H | 80 | 7.9 |
| 4B | I | 4.3 | 0 |

Example 5

Product J (comparative) is made as follows: 5.00 g of polyethyleneimine (Lupasol PR 8515 from BASF) is mixed with about 1.65 g of glycidoxypropyl trimethoxysilane (6 mole % based on the PEI recurring unit weight). The mixture is kept at room temperature for 16 hours, then heated at 75° C. for 4 hours to give a polymeric reaction product. Aqueous NaOH solution (20 g/L) is then added to hydrolyze the methoxysilane groups to —Si—ONa groups to make a 10% solution of the sodium salt.

Products K-R (hydrophobically modified) are made as follows: 5.00 g of polyethyleneimine (Lupasol PR 8515 from BASF) is mixed with about 1.65 g of glycidoxypropyl trimethoxysilane (6 mole % based on the PEI recurring unit weight) and the amount of a second nitrogen-reactive compound (5 mole % based on the PEI recurring unit weight) shown in Table 5. The mixtures are kept at room temperature for 16 hours, then heated at 75° C. for 4 hours to give polymeric reaction products. Aqueous NaOH solution (20 g/L) is then added to hydrolyze the methoxysilane groups to —Si—ONa groups to make a 10% solution of the sodium salt.

Tests comparing Products J-R (Table 5) in accordance with Test Procedure A show that the relatively more hydrophobic Products K-R give significantly better reduction in the amount of sodalite precipitated.

TABLE 5

| | | | |
|---|---|---|---|
| | | % Sodalite Precipitated | |
| No. | Product | Second Nitrogen-Reactive Compound | Dose (5 ppm) |
| 5A* | J | None | 100 |
| 5B | K | 4-nonylphenyl glycidyl ether | 0.5 |
| 5C | L | butyl glycidyl ether | 83 |
| 5D | M | 2-ethylhexyl glycidyl ether | 1.1 |
| 5E | N | phenyl glycidyl ether | 70 |
| 5F | O | $C_{12}$-$C_{14}$ alkylglycidyl ether | 8.4 |
| 5G | P | cresyl glycidyl ether | 23 |
| 5H | Q | octenylsuccinic anhydride | 6.5 |
| 5I | R | octadecenylsuccinic anhydride | 86 |

Example 6

Product S (comparative) is made as follows: 10.00 g of polyethyleneimine (Lupasol WF from BASF) is mixed with about 1.1 g of glycidoxypropyl trimethoxysilane (2 mole % based on the PEI recurring unit weight). The mixture is heated at 75° C. for 5 hours to give a polymeric reaction product. Aqueous NaOH solution (20 g/L) is then added to hydrolyze the methoxysilane groups to —Si—ONa groups to make a 10% solution of the sodium salt.

Product T (hydrophobically modified) is made as follows: 10.00 g of polyethyleneimine (Lupasol WF from BASF) is mixed with 1.10 g glycidoxypropyltrimethoxysilane (2 mole % based on the PEI recurring unit weight) and 0.064 g glycidyl 4-nonylphenylether (0.1 mole % based on the PEI recurring unit weight). The mixture is heated at 75° C. for 5 hours to give a polymeric reaction product. Aqueous NaOH solution (20 g/L) is then added to make a 10% solution of the sodium salt.

Products U and V are made in a similar fashion to Product T, except that 0.128 g glycidyl 4-nonylphenylether (0.2 mole % based on the PEI recurring unit weight) is used to make Product U, and 0.32 g glycidyl 4-nonylphenylether (0.5 mole % based on the PEI recurring unit weight) is used to make product V, instead of the amount of glycidyl 4-nonylphenylether used to make Product T.

Tests comparing Products S, T, U and V (Table 6) in accordance with Test Procedure A show that the relatively more hydrophobic Products E, F and G give significantly better reduction in the amount of sodalite precipitated, and that products containing relatively low levels of nonylphenyl (NP) provide improved performance.

TABLE 6

| | | | | |
|---|---|---|---|---|
| | | % Sodalite Precipitated | | |
| Product | | Dose | | |
| No. | (% NP) | 10 ppm | 5 ppm | 3 ppm |
| 6A* | S (0) | 5.0 | 22.6 | 43.5 |
| 6B | T (0.1) | 0.2 | 15.0 | 26.8 |
| 6C | U (0.2) | 0 | 12.7 | 25.4 |
| 6D | V (0.5) | 0 | 6.6 | 20.7 |

Examples 7-15

20.0 g of triethylenetetramine (TETA) is dissolved in a mixture of 50 ml of deionized water and 2.0 g of 50% sodium hydroxide. While stirring, 7.8 g of glycidyloxypropyltrimethoxysilane is added dropwise and the resulting mixture stirred for one hour. Then 10.1 gm of epichlorohydrin (Epi) is added dropwise. The temperature is held below 30° C. by cooling in an ice bath. After completion of an exotherm, 14.6 gm of 50% sodium hydroxide is added dropwise, with cooling to hold the temperature below 30° C. to give a polymeric reaction product (Example 7).

The polymer products of Examples 8-15 are prepared in a similar manner, except: In Examples 8-11 and 13, about a third (on molar basis) of the triethylenetetramine is replaced with 1,8-diaminooctane (Example 8), diaminoisophorone (Example 9), 1,2-diaminoethane (Example 10), 1,3-diaminopropane (Example 11) or 1,6-diaminohexane (Example 13); in Example 12, 20.0 gm of triethylenetetramine is first reacted with 0.2 mole (based on TETA and Epi) of glycidylnonylphenol (GNP) for 5 hrs at 80° C. before being reacted with the epichlorohydrin, sodium hydroxide and glycidyloxypropyltrimethoxysilane; and in Examples 14 and 15, the TETA is replaced with N,N'-bis(3-aminopropyl)ethylenediamine (BAPED) and N,N'-bis(3-aminopropyl)-1,3-propanediamine (BAPPD), respectively. The compositions of the resulting polymers are shown in Table 7A. The "mole %" values are expressed as percentages of total polymer backbone monomer (sum of all amines and epichlorohydrin).

TABLE 7A

| | | | | | | | | | | | | |
|---|---|---|---|---|---|---|---|---|---|---|---|---|
| | | | Polymer compositions | | | | | | | | | |
| Example | Oligomeric amine | Diamine | Moles Tetramine | Mole % Tetramine | Moles Diamin | Mole % Diamin | Mole Epi | Mole % Epi | Total polymer backbone moles | Moles GNP | Moles silane | Mole % silane |
| 7 | TETA | None | 1 | 55.56 | | 0.00 | 0.80 | 44.44 | 1.80 | | 0.24 | 13.33 |
| 8 | TETA | 1,8-diaminooctane | 0.7 | 33.33 | 0.60 | 28.57 | 0.80 | 38.10 | 2.10 | | 0.24 | 11.43 |
| 9 | TETA | diaminoisophorone | 0.7 | 33.33 | 0.60 | 28.57 | 0.80 | 38.10 | 2.10 | | 0.24 | 11.43 |
| 10 | TETA | 1,2-diaminoethane | 0.7 | 33.33 | 0.60 | 28.57 | 0.80 | 38.10 | 2.10 | | 0.24 | 11.43 |

TABLE 7A-continued

Polymer compositions

| Example | Oligomeric amine | Diamine | Moles Tetramine | Mole % Tetramine | Moles Diamin | Mole % Diamin | Mole Epi | Mole % Epi | Total polymer backbone moles | Moles GNP | Moles silane | Mole % silane |
|---|---|---|---|---|---|---|---|---|---|---|---|---|
| 11 | TETA | 1,3-diaminopropane | 0.7 | 33.33 | 0.60 | 28.57 | 0.80 | 38.10 | 2.10 | | 0.24 | 11.43 |
| 12 | TETA | none | 1 | 55.56 | | 0.00 | 0.80 | 44.44 | 1.80 | 0.20 | 0.24 | 13.33 |
| 13 | TETA | 1,6-diaminohexane | 0.7 | 33.33 | 0.60 | 28.57 | 0.80 | 38.10 | 2.10 | | 0.24 | 11.43 |
| 14 | BAPED | none | 1 | 55.56 | | 0.00 | 0.80 | 44.44 | 1.80 | | 0.24 | 13.33 |
| 15 | BAPPD | none | 1 | 55.56 | | 0.00 | 0.80 | 44.44 | 1.80 | | 0.24 | 13.33 |

TETA = triethylenetetramine
BAPED = N,N'-Bis(3-aminopropyl)ethylenediamine
BAPPD = N,N'-Bis(3-aminopropyl)-1,3-propanediamine
Epi = Epichlorohydrin
Example 12 was prepared with 0.2 moles GMP The polymers of Examples 7-15 comprise a recurring unit of the formula (I) and a recurring unit of the formula (II) in which E is —$CH_2CH(OH)CH_2$—, $A^1$ is $CH_2CH(OH)CH_2$—O—$CH_2CH_2CH_2$—, R" is Na, and in which $A^2$, T and Q are shown in Table 7B below.

TABLE 7B

Polymer compositions

| Ex. | $A^2$ | T | Q |
|---|---|---|---|
| 7 | none | —$(CH_2)_2$— | H |
| 8 | none | —$(CH_2)_8$— + —$(CH_2)_2$— | H |
| 9 | none | Isophorone 5-(1,3,3-trimethylcyclohexylmethyl) + —$(CH_2)_2$— | H |
| 10 | none | —$(CH_2)_2$— | H |
| 11 | none | —$(CH_2)_3$— + —$(CH_2)_2$— | H |
| 12 | —$CH_2CH(OH)CH_2$—O— | —$(CH_2)_2$— | nonylphenyl |
| 13 | none | —$(CH_2)_6$— + —$(CH_2)_2$— | H |
| 14 | none | —$(CH_2)_3$— + —$(CH_2)_2$— | H |
| 15 | none | —$(CH_2)_3$— | H |

Examples 16A-N

Tests comparing the polymer products of Examples 7-15 in accordance with Test Procedure A show (Table 8) that the relatively more hydrophobic of Examples 7-15 generally give better reduction in the amount of sodalite precipitated. For these tests, the blank contains no polymer.

TABLE 8

% Sodalite Precipitated

| Ex. | Product | 10 ppm | 20 ppm | 50 ppm | 300 ppm |
|---|---|---|---|---|---|
| 16A | Example 7 | 98 | 96 | 96 | 87 |
| 16B | Example 8 | 31 | 2 | 4 | |
| 16C | Example 9 | 80 | 46 | 31 | |
| 16D | Example 7 | 98 | 98 | | |
| 16E | Example 10 | 98 | 97 | | 92 |
| 16F | Example 11 | 99 | 100 | | 97 |
| 16G | Example 8 | 8 | 1 | | |
| 16H | Example 9 | 58 | 5 | | |
| 16I | Example 12 | 66 | 60 | | |
| 16J | Example 7 | 99 | 98 | | |
| 16K | Example 8 | 11 | 1 | | |
| 16L | Example 13 | 91 | 52 | | |
| 16M | Example 14 | 24 | 1 | | |
| 16N | Example 15 | 2 | 0 | | |

Examples 17-30

A difficult-to-treat synthetic liquor (representative of a high level nuclear waste stream) is prepared by dissolving the appropriate salts in water to provide the composition shown in Table 9.

TABLE 9

| Liquor component | Molarity |
|---|---|
| $OH^-$ | 1.60 |
| Al | 0.50 |
| Si | 0.0156 |
| $NO_3^-$ | 1.94 |
| $NO_2^-$ | 1.37 |
| $CO_3^-$ | 0.31 |
| $C_2O_4^-$ | 0.00345 |
| $PO_4^{3-}$ | 0.016 |
| K | 0.0090 |
| Cl | 0.010 |
| $SO_4^{2-}$ | 0.028 |

A series of hydrophobically modified polyethyleneimines are prepared in a manner similar to that described for Product B1 in Example 1 above, except that butyl chloride (Hydrophobe type: B), hexyl chloride (Hydrophobe type: H), or 4-nonylphenyl glycidyl ether (Hydrophobe type: GNP) are used in place of chlorooctane. Tests are conducted comparing the performance of the resulting polymer products to one another, using the difficult-to-treat synthetic liquor described in Table 9, in accordance with the test method described above. The results shown in Table 10 illustrate the utility of these polymer products for reducing the amount of sodalite precipitated in this difficult-to-treat synthetic liquor. In Table 10, the Scale % is reported as a percentage of the blank in which no scale inhibitor was used.

TABLE 10

| Example | Silane content mole % | PEI MW | Hydrophobe type and mole % | Dose mg/L | Scale % vs Blank |
|---|---|---|---|---|---|
| 17 | 4 | 25k | B (5%) | 300 | 9 |
| 18 | 4 | 25k | B (11%) | 300 | 10 |
| 19 | 4 | 25k | B (18%) | 300 | 10 |
| 20 | 4 | 25k | B (25%) | 300 | 14 |
| 21 | 4 | 25k | H (5%) | 300 | 7 |
| 22 | 4 | 25k | H (11%) | 300 | 9 |
| 23 | 4 | 25k | H (18%) | 300 | 11 |
| 24 | 4 | 25k | H (25%) | 300 | 12 |
| 25* | 4 | 1.2k | None | 300 | 99 |
| 26 | 4 | 1.2k | GNP (2%) | 300 | 100 |
| 27 | 4 | 1.2k | GNP (5%) | 300 | 80 |
| 28 | 4 | 1.2k | GNP (10%) | 300 | 4 |
| 29 | 4 | 1.2k | GNP (15%) | 300 | 2 |
| 30 | 4 | 25k | GNP (8%) | 300 | 25 |

Examples 31-34

Polymer #1 is made in the same manner as Product C in Example 2, except that twice as much glycidyl 4-nonylphenyl ether (2 mole % based on the PEI unit weight) is used.

Polymer #2 is made in the same manner as Product C in Example 2, except that glycidyl 2-ethylhexyl ether (2 mole % based on the PEI unit weight) is used instead of glycidyl 4-nonylphenyl ether.

Polymer #3 is made in the same manner as Product C in Example 2, except that glycidyl octyl/decyl ether (2 mole % based on the PEI unit weight) is used instead of glycidyl 4-nonylphenyl ether.

Tests comparing Products #1, #2 and #3 with Product A are conducted in accordance with Test Procedures A and C (Table 11). The results show that the relatively more hydrophobic polymers of Examples 31-33 provide significantly better reductions in scale than the less hydrophobic Product A for both of the difficult-to-treat liquors.

TABLE 11

| | | % Sodalite Precipitated | |
|---|---|---|---|
| | | Test Procedure | |
| No. | Product | A (5 ppm dose) | B (5 ppm dose) |
| 31* | A | 20 | 46 |
| 32 | Polymer #1 | 0 | 3.8 |
| 33 | Polymer #2 | 0 | 0.1 |
| 34 | Polymer #3 | 0.6 | 11.6 |

Examples 35-52

The products shown in Tables 12 and 13 below are made with the same PEI and in the same manner as Product F in Example 3, except the nonylphenyl group is replaced with octyl/decyl (10 mole % vs. PEI) or 2-ethylhexyl (5 mole % vs. PEI), and the mole % of glycidoxypropyltrimethoxysilane vs. the PEI is varied as shown. The results of tests conducted on these polymers in accordance with Test Procedures A, B and C show that the relatively more hydrophobic polymers generally provide significantly better reductions in scale than the control polymers for all three of the difficult-to-treat liquors.

TABLE 12

| | | % sodalite formed vs. blank (no reagent added) | | | |
|---|---|---|---|---|---|
| | | Test Procedure A | | Test Procedure C | |
| | | Dosage | | | |
| | Hydrophobic group (silane) | 4 ppm | 10 ppm | 5 ppm | 10 ppm |
| Product D | none (4% silane) | | 100 | | |
| Product #4 | 10% octyl/decyl (4% silane) | 0 | | 4.7 | 3.3 |
| Product #5 | 10% octyl/decyl (5% silane) | 0 | | 3.1 | 1.7 |
| Product #6 | 10% octyl/decyl (6% silane) | 0 | | 2.0 | 1.8 |
| Product #7 | 10% octyl/decyl (8% silane) | 0 | | 2.3 | 0.4 |
| Product F | 5% nonylphenyl (4% silane) | 0 | | 8.2 | 0.2 |
| Product K | 5% nonylphenyl (6% silane) | 1.8 | | 8.0 | 0.7 |
| Product #8 | 5% 2-ethylhexyl (4% silane) | 2.3 | | 10.7 | 3.5 |
| Product M | 5% 2-ethylhexyl (6% silane) | 0.6 | | 4.2 | 0.9 |
| Product #9 | 5% 2-ethylhexyl (8% silane) | 4.0 | | 5.9 | 1.1 |

TABLE 13

| | | % sodalite formed vs. blank (no reagent added) | | | |
|---|---|---|---|---|---|
| | | Test Procedure A | | Test Procedure B | |
| | | Dosage | | | |
| | Hydrophobic group (silane) | 4 ppm | 10 ppm | 5 ppm | 10 ppm |
| Product D | none (4% silane) | | 100 | | |
| Product #4 | 10% octyl/decyl (4% silane) | 0 | | 4.7 | (7.2) |
| Product #5 | 10% octyl/decyl (5% silane) | 0 | | 6.4 | 1.2 |
| Product #6 | 10% octyl/decyl (6% silane) | 0 | | 5.7 | 0 |
| Product #7 | 10% octyl/decyl (8% silane) | 0 | | 0 | 0 |
| Product K | 5% nonylphenyl (6% silane) | 1.8 | | 0 | 0 |
| Product M | 5% 2-ethylhexyl (6% silane) | 0.6 | | 1.3 | 0 |
| Product #9 | 5% 2-ethylhexyl (8% silane) | 4.0 | | 5.9 | 1.1 |

Examples 53-104

Polymer products are made and tested as described in Examples 1-52 above, except that potassium salts of the polymers are made by hydrolyzing with potassium hydroxide in place of sodium hydroxide. Similar results are achieved.

Examples 105-156

Polymer products are made and tested as described in Examples 1-52 above, except that potassium salts of the polymers are made by hydrolyzing with ammonium hydroxide in place of sodium hydroxide. Similar results are achieved.

It will be appreciated by those skilled in the art that various modifications and changes can be made without departing from the scope of the embodiments disclosed herein. Such modifications and changes are intended to fall within the scope of the embodiments disclosed herein, as defined by the appended claims.

What is claimed is:
1. A method of treating scale in a process stream comprising:
   intermixing with a process stream a composition comprising a polymeric reaction product of a polyamine, a first nitrogen-reactive compound, and a second nitro- gen-reactive compound, the polymeric reaction product having a weight average molecular weight of at least 500, wherein the composition is present in an amount effective to reduce or eliminate scale in the process stream, wherein the first nitrogen-reactive compound comprises a —Si(OR)$_3$ group and a nitrogen-reactive group, wherein R is H, optionally substituted $C_1$-$C_{20}$ alkyl, optionally substituted $C_6$-$C_{12}$ aryl, optionally substituted $C_7$-$C_{20}$ aralkyl, optionally substituted $C_2$-$C_{20}$ alkenyl, Group I metal ion, Group II metal ion, or $NR^1_4$, wherein each $R^1$ is independently selected from H, optionally substituted $C_1$-$C_{20}$ alkyl, optionally substituted $C_6$-$C_{12}$ aryl, optionally substituted $C_7$-$C_{20}$ aralkyl, and optionally substituted $C_2$-$C_{20}$ alkenyl;

wherein the second nitrogen-reactive compound comprises a nitrogen-reactive group and does not contain a —Si(OR)$_3$ group;

wherein at least one of the polyamine and the second nitrogen-reactive compound comprises an optionally substituted hydrocarbyl radical comprising from 2 to 40 carbons;

wherein the process stream comprises at least one of a sulfate level of at least 1 g/L, a iron oxide level of at least 20 mg/L, a sodalite level of at least 20 mg/L, and a combined nitrate/nitrite concentration of at least 0.5 molar; and wherein the polyamine comprises a $(NR^4_2)$-J-$(NR^4_2)$ moiety;

J is an optionally substituted hydrocarbyl fragment comprising from 2 to 40 carbons;

and each $R^4$ is independently H, optionally substituted $C_1$-$C_8$ alkyl, or optionally substituted $C_6$-$C_{10}$ aryl.

2. The method according to claim 1, wherein the polymeric reaction product comprises a unit of formula (I) and a unit of formula (II):

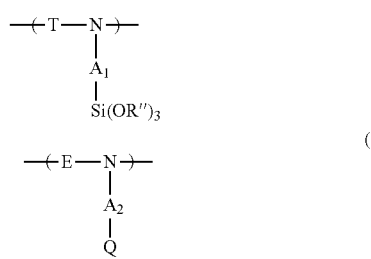

wherein

T and E are each independently a first optionally substituted hydrocarbyl radical comprising from 2 to 40 carbons;

Q is H or a second optionally substituted hydrocarbyl radical comprising from 1 to 20 carbons;

$A_1$ and $A_2$ are each independently a direct bond or an organic connecting group comprising from 1 to 20 carbons; and R″ is H, optionally substituted $C_1$-$C_{20}$ alkyl, optionally substituted $C_6$-$C_{12}$ aryl, optionally substituted $C_7$-$C_{20}$ aralkyl, optionally substituted $C_2$-$C_{20}$ alkenyl, Group I metal ion, Group II metal ion, or $NR^1_4$, wherein each $R^1$ is independently selected from H, optionally substituted $C_1$-$C_{20}$ alkyl, optionally substituted $C_6$-$C_{12}$ aryl, optionally substituted $C_7$-$C_{20}$ aralkyl, and optionally substituted $C_2$-$C_{20}$ alkenyl.

3. The method according to claim 2, wherein the polymeric reaction product comprising a unit of formula (I) and a unit of formula (II) comprises at least one of the following provisos:

a first proviso wherein when $A_2$-Q is H, at least one of T and E comprises four or more carbon atoms;

a second proviso wherein when $A_2$-Q is not H, at least one of T and E comprises two or more carbon atoms;

a third proviso wherein Q does not contain a Si(OR)$_3$ group;

a fourth proviso wherein $A_2$ is not unsubstituted —C(=O)-alkyl; and a fifth proviso wherein when Q is OH or $NH_2$, $A_1$ and $A_2$ are not both alkylene.

4. The method according to claim 1, wherein the process stream is selected from the group consisting of a Bayer process stream, boiler water, a nuclear waste process stream, and a papermaking process stream.

5. The method according to claim 4, wherein the process stream is a Bayer process stream.

6. The method according to claim 1, wherein the scale is at least aluminosilicate scale.

7. The method according to claim 1, wherein R is a Group I metal ion, Group II metal ion, or $NR^1_4$.

8. The method according to claim 1, wherein the process stream comprises at least 1 g/L of sodium sulfate.

9. The method according to claim 1, wherein the process stream comprises at least 20 mg/L of iron oxide.

10. The method according to claim 1, wherein the process stream comprises at least 20 mg/L of sodalite.

11. The method according to claim 1, wherein the process stream has a combined nitrate/nitrate concentration of at least 0.5 molar.

12. The method according to claim 1, wherein the second nitrogen-reactive compound comprises at least two nitrogen-reactive moieties.

13. The method according to claim 1, wherein the first nitrogen-reactive compound is glycidoxypropyl trimethoxysilane.

14. The method according to claim 1, wherein the second nitrogen-reactive compound is chosen from $C_1$-$C_{20}$ alkyl halides, alkenyl halides, aralkyl halides, alkyl sulfates, glycidyl alcohols, glycidyl phenols, and glycidyl amines, and compounds containing an anhydride group.

15. The method according to claim 1 wherein the second nitrogen-reactive compound is chosen from dimethylsulfate, chlorooctane, chlorohexane, benzyl chloride, epichlorohydrin, glycidyl 4-nonylphenylether, butyl glycidyl ether, 2-ethylhexyl glycidyl ether, phenyl glycidyl ether, $C_{12}$-$C_{14}$ alkyl glycidyl ether, cresyl glycidyl ether, octenylsuccinic anhydride and octadecenylsuccinic anhydride.

* * * * *